No. 659,664. Patented Oct. 16, 1900.
C. M. GREEN & J. G. CALLAN.
SYSTEM OF ELECTRICAL DISTRIBUTION.
(Application filed June 30, 1900.)
(No Model.)
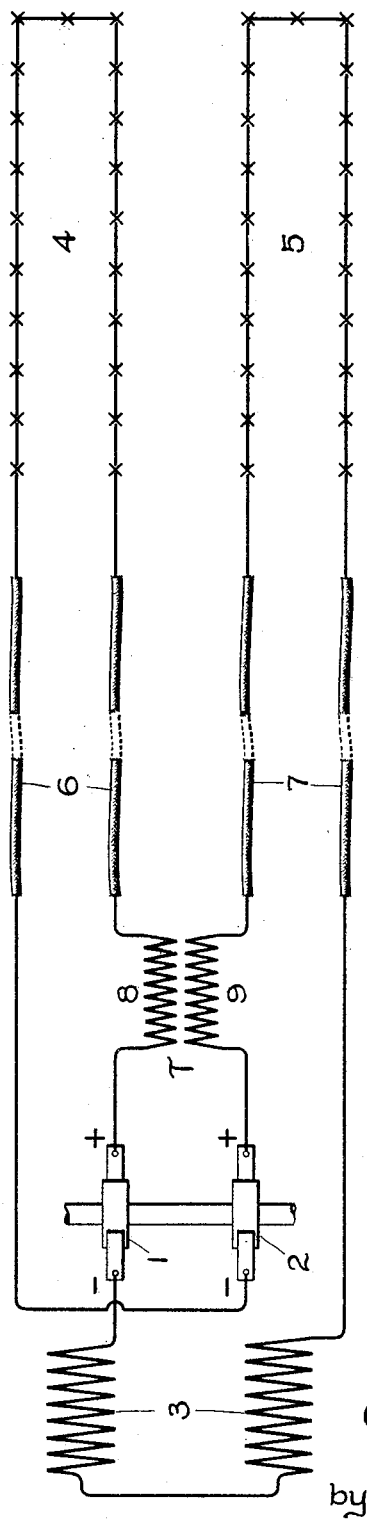
Witnesses:
Inventors:
Charles M. Green,
John G. Callan,
by Albert G. Davis
Atty

UNITED STATES PATENT OFFICE.

CHARLES M. GREEN AND JOHN G. CALLAN, OF LYNN, MASSACHUSETTS, ASSIGNORS TO THE GENERAL ELECTRIC COMPANY, OF NEW YORK.

SYSTEM OF ELECTRICAL DISTRIBUTION.

SPECIFICATION forming part of Letters Patent No. 659,664, dated October 16, 1900.

Application filed June 30, 1900. Serial No. 22,104. (No model.)

*To all whom it may concern:*

Be it known that we, CHARLES M. GREEN and JOHN G. CALLAN, citizens of the United States, residing at Lynn, county of Essex, State of Massachusetts, have invented certain new and useful Improvements in Systems of Electrical Distribution, (Case No. 1,413,) of which the following is a specification.

Our present invention relates to certain means for preventing puncturing of underground cables in cases where the cables are fed from sources of fluctuating electromotive force—such, for example, as the well-known Brush multicircuit-arc generator. The multicircuit system comprises a plurality of circuits, each of which is fed from a commutator or set of commutators on the generator. It has been found by experiment that the electromotive force between the terminals of each commutator of a machine of the kind specified fluctuates within fairly-wide limits; but when connected in series with the electromotive forces of other commutators a current of practically-constant intensity results. When the commutators are connected alternately with separate circuits containing translating devices in accordance with the multicircuit principle as set forth, for example, in the patent to C. M. Green, No. 613,880, dated November 8, 1898, the electromotive forces on the separate commutators give rise to a current of uniform value if the consumption-circuit does not include underground cables or other apparatus possessing static capacity. If, however, underground cables are employed, it has been found that the alternating electromotive forces appearing between the different commutators become unequal, this effect being due probably to the distributed capacity of the cable or cables, which causes not only the alternating electromotive forces but also the currents flowing at any given instant in different portions of the circuit to differ in intensity. This may give rise to a more or less dangerous strain upon the insulation of a cable, and in many instances the resultant electromotive forces are such as to break down and destroy the insulation of the same. We have found that if the various branches of the multicircuit system be inductively related—as, for example, through the windings of a transformer or transformers—the currents and electromotive forces may be so far equalized as to almost entirely suppress the dangerous effects due to the fluctuating voltage of the commutators or other source.

The principles of our invention will readily be understood by reference to the accompanying drawing and following description, while its points of novelty will be set forth in the claims appended hereto.

In the drawing two commutators, Nos. 1 and 2, are shown as representing the commutators of a Brush multicircuit-machine. The field-winding of the machine is indicated at 3, while the connections between the field-windings, commutators, and the two external circuits containing translating devices (indicated at 4 5, respectively) are so made as to include in series, first, one of the commutators, as the commutator 1, then the work-circuit 4, then the commutator 2, then the work-circuit 5, and back to the commutator 1 to the field-winding 3. If the work-circuits 4 and 5 are fed through the instrumentality of underground cables, as represented diagrammatically at 6 and 7, large alternating electromotive forces may appear between brushes of like polarity, even though direct-current voltmeters would under such circumstances indicate no difference of potential between these points. Under the circumstances mentioned the alternating electromotive forces may give rise to oscillating or resonant effects due to the distributed capacity of the cable, and the electromotive forces thus produced may often be such as to pierce or destroy the cable insulation, as has before been briefly mentioned. To prevent these effects, we cause the work-circuits to be inductively related to each other through the medium of a transformer T, having one winding 8 in series with the work-circuit 4 and the other winding 9 in series with the work-circuit 5. The connections are made so that the magnetic effect of one winding is opposed to that of the other. The ratio of transformation is preferably one to one. In other words, each winding has an equal number of turns.

Although we have indicated above but a single application of our invention, it will be evident to those skilled in the art that it is capable of use in many other relations than the one specified, for which reason we do not wish our claims limited to the precise apparatus shown.

What we claim as new, and desire to secure by Letters Patent of the United States, is—

1. The combination of a series circuit, including underground cables, of an inductive connection between points in the length of said circuit.

2. The combination with a series circuit in which sources of electromotive force alternate with groups of translating devices, of an inductive connection between points in the circuit separated by translating devices.

3. The combination with the commutators of a multicircuit-generator, of a plurality of circuits leading therefrom, and an inductive connection between two of the circuits.

4. The combination with the commutators of a multicircuit-generator, of a plurality of circuits leading therefrom, and inductive connections between the circuits.

5. In a multicircuit system of distribution, the combination of sources of fluctuating electromotive force, a series system of distribution supplied thereby, and means for equalizing the resultant fluctuations of voltages.

6. The combination with a series circuit including sources of electromotive force separated by translating devices, of an inductive connection between non-adjacent points in the circuit.

In witness whereof we have hereunto set our hands this 26th day of June, 1900.

CHARLES M. GREEN.
JOHN G. CALLAN.

Witnesses:
 DUGALD MCKILLOP,
 HENRY O. WESTENDARP.